April 3, 1945.　　　A. ROBERTSON　　　2,372,682
WIRE SUPPORTING CLIP
Filed Nov. 6, 1943
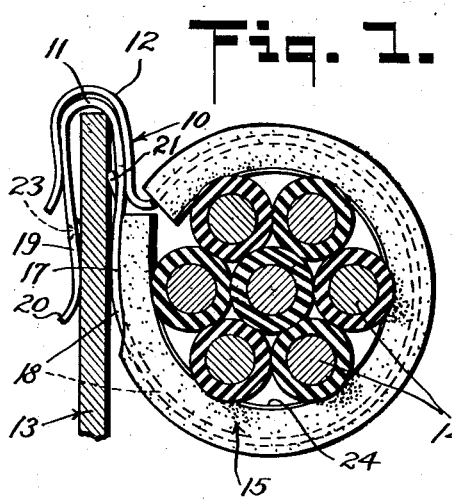
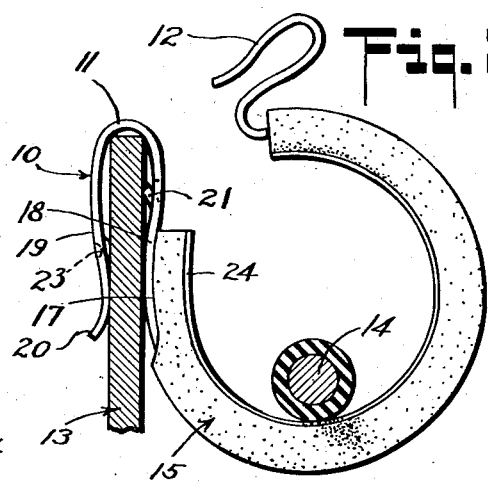
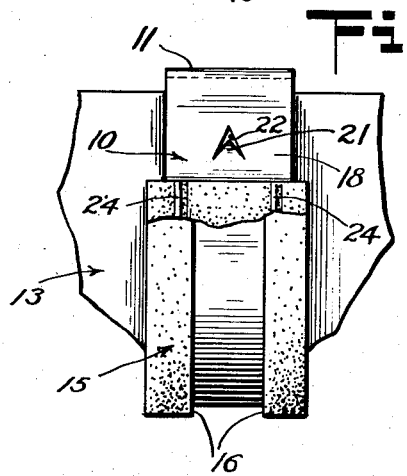
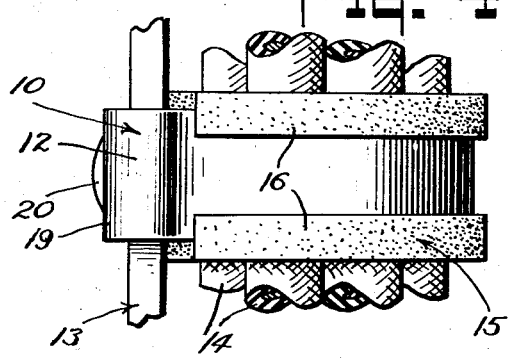
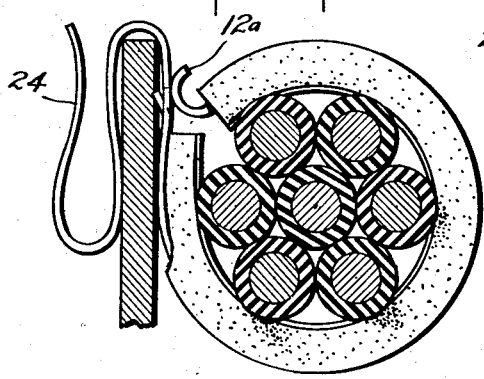
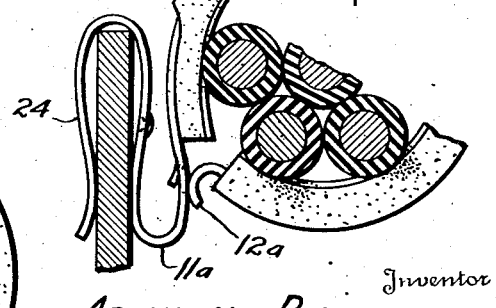
Inventor
ARCHIBALD ROBERTSON
By R. S. Berns
Attorney Patented Apr. 3, 1945

2,372,682

UNITED STATES PATENT OFFICE 2,372,682

WIRE SUPPORTING CLIP

Archibald Robertson, North Hollywood, Calif., assignor to Adel Precision Products Corp., a corporation of California Application November 6, 1943, Serial No. 509,337

6 Claims. (Cl. 248—74)

This invention relates to a clip for embracing and supporting a group of electrical wires and the like upon aircraft.

Owing to the large number of wires which it is necessary to install upon aircraft in such a manner as to keep them securely in place notwithstanding the severe vibration to which such wires are subjected it is necessary to support each wire or bundle of wires at close intervals along its length. This requires that a large number of wire supporting clips be put into place every time an airplane is equipped for service. Hence there is a demand for a wire supporting clip of a kind that can be manufactured at a low cost, put in place more rapidly, and which will be sufficiently sturdy and wear-resistant to be durable and to function in a dependable manner.

With a view to complying with the aforementioned exacting demands objects of the present invention are: to provide a one-piece wire supporting sheet metal clip that can be more rapidly mounted, removed and replaced; to provide a clip having a novel arrangement of terminal loops which will enable the workman to put the clip securely in its wire-supporting position in a more rapid manner and to demount it more quickly to put in place additional wires or to replace damaged wires by new ones; to provide a clip which can be applied to its support in different positions as may be required in order to position differently the wires sustained thereby; and, more specifically speaking, to provide a wire-supporting clip having looped end portions which are arranged to cooperate with each other in a novel, more advantageous manner for the purpose of expediting the work of putting the clip in place and to add to its efficiency as a wire-support.

Another specific object of the invention is to provide a clip of the aforementioned kind having looped end portions which are so shaped and related to each other that they not only cooperate to fasten together the ends of the clip in its wire-embracing position, but also cooperate to form a reinforced mounting means to attach the clip to a support in a very stable manner.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a clip embodying my invention, a group of insulated wires being shown supported thereby, said wires and a fragment of the supporting member being shown in section;

Fig. 2 is also an elevation of the clip, but differs from Fig. 1 in that only a single wire is shown being supported by the clip, and the looped ends of the clip are shown in a separated relation to each other to provide for placing additional wires therein;

Fig. 3 is a side elevation of the mounted clip looking from the right to the left of Fig. 2, the upper portion of the right hand part of the structure shown in Fig. 2 being broken away;

Fig. 4 is a plan view of the structure shown in Fig. 2;

Fig. 5 is a reproduction of Fig. 1 except that a modified form of the invention is shown wherein the supporting part of the clip is provided with an additional loop;

Fig. 6 is a reproduction of a fragment of the structure shown in Fig. 5, but illustrates the clip applied to the support in a different manner.

Referring in detail to the drawing, the clip is shown in Figs. 1 to 4 as comprising a sheet metal strap 10 bent into a generally circular form, and having at one end a looped portion 11 and at its opposite end a looped portion 12. The looped portion 11 is shown placed in a saddle-like fashion over the upper edge portion of an airplane frame member 13.

The clip is shown supporting a group of insulated wires 14. In order to cushion the wires which are supported by the clip in a more effective manner the clip is extended longitudinally through an elongated cushion member 15 which completely covers the inner face of the clip and which is provided along each edge of its outer sides with an inwardly directed flange portion 16 which keeps the cushion in place upon the clip. That end of the cushion 15 which is adjacent to the loop 11 of the metal strap terminates at about the mid-length of said loop so that the closed end portion of the loop is in an exposed position for having the loop 12 sprung over it, as shown in Fig. 1.

Describing in further detail the looped end portions of the clip, the cushion flanges 16 are cut away at 17 at one end of the cushion for a sufficient distance to prevent them from keeping the inner run 18 of the loop 11 from contacting directly with the surface of the support 13 upon which the device is shown supported. The loop 11 is shown having an outer run 19 with a deflected extremity 20. The loop 12 is shown positioned to seat in a saddle-like manner upon and at the same time firmly to grip exteriorly the loop 11 when the device is in the completely mounted position as shown in Fig. 1.

In order to cause the looped end portions of the clip to cooperate with each other in the desired manner, the open ends of both of said loops are directed substantially tangentially in relation to the clip as a whole and both open in the same direction, that direction being left hand or counter-clockwise in the illustrated embodiments of the invention. Also the loop 11 is made about twice as long as the loop 12, so that when the device is in the mounted position shown in Fig. 1 the loop 12 embraces and grips only about half the length of the other loop. The two loops therefore combine not only to attach to each other the end portions of the clip but also combine to afford a reinforced or double grip upon the upper edge portion of the plate-like support 13.

In order to give the clip a more secure foothold upon the member 13 the run 18 of the loop 11 is provided with an internal spur 21 which is inclined toward the bent end of the loop. Said spur is formed by making a V-shaped cut 22 through the metal and at the same time indenting and thus inclining the part which forms the spur, as is clearly shown in Figs. 1 to 3, the point of the spur being thus spaced somewhat away from the apex of the V cut. In the form of the invention shown in Figs. 1 and 2 the gripping of the loop 10 by the overlying loop 12 crowds the spur 21 against the wall or plate 13, thus causing said spur to function more efficiently; and in the construction illustrated in Fig. 5 the curl 12a also presses the spur toward the part which it is designed to act upon.

As an additional aid to the gripping function of the loops the outer run 19 of the loop 11 is provided with an interior indentation 23 which contacts with the adjacent face of the support when the device is in the applied position.

In Figs. 5 and 6 is shown a modification wherein the loop 11a is extended to form an additional loop 24, the latter loop being, if desired, positioned to maintain the device in the reversely mounted position shown in Fig. 6. In this embodiment of the invention a semi-circular curl 12a is substituted for the loop 12, said curl being positioned to abut against the inner run of the loop 11a whether the device is mounted in the position shown in Fig. 5 or in the inverted position shown in Fig. 6.

In both embodiments of the invention the clip will be made of resilient material, the construction thereof being such as to admit of the ready opening thereof at one side for insertion and removal of the wires to be supported thereby. The loops 11, 12 and 24 when in unstressed condition, all have contracted mouth portions which cause them, when sprung more widely open by being applied to the support, to grip the latter more firmly.

Also, in both embodiments, the cushion 15 is shown having a plurality of ribs or beads 24 extending lengthwise of its inner face, said ribs being compressed at the points where they are engaged by the wires which are supported by the device, it being understood that the cushions are made of a rubber-like, compressible material. These ribs give the cushion a better grip upon the wires being supported.

When the clip is constructed as shown in Figs. 5 and 6 it should be so tensioned as normally to maintain itself in substantially a circular shape, but yet be capable of having its ends manually sprung apart to provide a gap through which to insert the wires to be supported.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. A supporting clip for wires or conduits comprising a sheet metal strap the end portions at least of which are resilient, each of said end portions being bent into a loop having an open end, one of said loops being positionable astride the upper edge portion of an upstanding wall or plate to support the clip, and the other of said loops being at the same time disposable in an overlying gripping engagement with said supporting loop, said strap as a whole being adjustable from a C-shape to a closed annulus and vice versa.

2. In a supporting clip for wires or conduits, a sheet metal strap having a resilient looped end portion to grip in a flatwise manner the upper edge portion of an upstanding plate-like support, said looped end portion having an interal spur which is angularly directed to bite into the support to oppose withdrawal of the clip therefrom, and having also a projection which is directed internally from the side thereof which is opposite to said spur.

3. In a supporting clip for wires or conduits, a sheet metal strap having at one end a resilient looped portion to grip in a flatwise manner the upper edge portion of an upstanding plate-like support, said looped end portion having an internal spur which is angularly directed to bite into the support to oppose withdrawal of the clip therefrom, said strap having a looped portion at its opposite end positioned to overlie and grip the first recited looped portion and thereby press said spur more firmly against the support.

4. A supporting clip for wires or conduits comprising a sheet metal strap the end portions at least of which are resilient, each of said end portions being bent into a loop having an open end, one of said loops being positionable astride the upper edge portion of an upstanding wall or plate to support the clip, and the other of said loops being at the same time disposable astride said supporting loop, said strap as a whole being adjustable from a C-shape to a closed annulus and vice versa, the strap being continued beyond said supporting loop and rebent into an additional loop which has an open side that is directed oppositely to the open side of said supporting loop.

5. A device for supporting wires or conduits comprising a strap of sheet metal having resilient end portions and being as a whole manually adjustable from a C-shape to substantially a closed annulus, said strap having an end portion shaped as a loop having a mouth portion which is directed tangentially in a fixed, except for its resiliency, relation to the strap as a whole, an elongated cushion longitudinally through which said strap extends from end to end of said cushion, said cushion throughout its length completely covering the inner or concave face of the strap and having exterior side flanges which overlie the outer faces of the side edge portions of the strap, said flanges being cut away where they would otherwise overlie the aforesaid looped portion of the strap and a considerable portion of said looped portion projecting beyond the adjacent end portion of said cushion in an exposed position, and means carried by the end portion of said strap opposite to its said looped portion to couple onto the exposed part of said looped portion to maintain the strap adjusted in its annular form.

6. A device for supporting wires or conduits comprising a strap of sheet metal having resilient end portions and being as a whole manually adjustable from a C-shape to substantially a closed annulus, said strap having an end portion shaped as a loop having a mouth portion which is directed tangentially in relation to the strap as a whole, an elongated cushion longitudinally through which said strap extends from end to end of said cushion, said cushion throughout its length completely covering the inner or concave face of the strap and having exterior side flanges which overlie the outer faces of the side edge portions of the strap, said flanges being cut away where they would otherwise overlie the aforesaid looped portion of the strap and a considerable portion of said looped portion projecting beyond the adjacent end portion of said cushion in an exposed position, and a second looped portion carried by the end of the strap opposite to the first recited loop portion, said second looped portion being positioned to grip externally the exposed part of the first recited loop portion to maintain the strap adjusted in its annular form

ARCHIBALD ROBERTSON.